United States Patent
Cuddihy et al.

(10) Patent No.: US 11,216,477 B2
(45) Date of Patent: Jan. 4, 2022

(54) SYSTEM AND METHOD FOR PERFORMING SEMANTICALLY-INFORMED FEDERATED QUERIES ACROSS A POLYSTORE

(71) Applicant: General Electric Company, Schenectady, NY (US)

(72) Inventors: Paul Edward Cuddihy, Ballston Lake, NY (US); Jenny Marie Weisenberg Williams, Niskayuna, NY (US); Kareem Sherif Aggour, Niskayuna, NY (US); Vijay S Kumar, Niskayuna, NY (US); Varish Mulwad, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 66 days.

(21) Appl. No.: 16/748,044

(22) Filed: Jan. 21, 2020

(65) Prior Publication Data
US 2021/0224271 A1    Jul. 22, 2021

(51) Int. Cl.
*G06F 16/30* (2019.01)
*G06F 16/2458* (2019.01)
(Continued)

(52) U.S. Cl.
CPC .......... *G06F 16/2471* (2019.01); *G06F 16/22* (2019.01); *G06F 16/2433* (2019.01); *G06F 16/24535* (2019.01); *G06F 16/9566* (2019.01)

(58) Field of Classification Search
CPC .. G06F 16/2471; G06F 16/22; G06F 16/2433; G06F 16/9566; G06F 16/24535
(Continued)

(56) References Cited

U.S. PATENT DOCUMENTS 8,412,746 B2    4/2013   Fox et al.
8,510,321 B2    8/2013   Ranganathan et al.
(Continued)

OTHER PUBLICATIONS

Buil-Aranda, Carlos et al., "Federating Queries in SPARQL 1.1: Syntax, Semantics and Evaluation", Journal of Web Semantics, vol. No. 18, Issue No. 1, Jan. 2013, DOI: 10.1016/j.websem.2012.10.001, (pp. 1-17, 17 total pages).

(Continued)

*Primary Examiner* — Sana A Al-Hashemi
(74) *Attorney, Agent, or Firm* — Buckley, Maschoff & Talwalkar LLC

(57) ABSTRACT

According to some embodiments, a system, method and non-transitory computer-readable medium are provided comprising receiving a node group at an integration module, wherein the node group includes one or more requests for internal data and external data, wherein internal data is data stored in an internal datastore and external data is data stored outside of the internal data store; identifying in a configuration data, one or more meta-data nodes from the node group, wherein each meta-data node indicates a request for external data; retrieving the internal data via execution of an internal data query; determining an order of execution for the one or more meta-data nodes; executing a first meta-data node based on the determined order to generate a first result; ingesting the first result into a semantic datastore; and executing a query to generate a final result, wherein the query includes the retrieved internal data and the ingested first result. Numerous other aspects are provided.

19 Claims, 13 Drawing Sheets

(51) Int. Cl.
    *G06F 16/242*     (2019.01)
    *G06F 16/2453*     (2019.01)
    *G06F 16/955*     (2019.01)
    *G06F 16/22*     (2019.01)

(58) Field of Classification Search
USPC ....... 707/605, 609, 687, 705, 769, 790, 813, 707/821
See application file for complete search history.

(56) References Cited

U.S. PATENT DOCUMENTS

| | | | |
|---|---|---|---|
| 9,229,930 B2 | 1/2016 | Sundara et al. | |
| 9,760,614 B2 | 9/2017 | Cuddihy et al. | |
| 11,093,556 B2 * | 8/2021 | Li | G06F 16/955 |
| 2009/0106234 A1 * | 4/2009 | Siedlecki | G06F 16/211 |
| 2016/0078128 A1 | 3/2016 | McHugh et al. | |
| 2017/0103125 A1 * | 4/2017 | Sapkota | G06F 16/3322 |
| 2017/0124193 A1 * | 5/2017 | Li | G06F 16/367 |
| 2019/0034811 A1 | 1/2019 | Cuddihy et al. | |
| 2019/0213185 A1 | 7/2019 | Arroyo et al. | |
| 2020/0089182 A1 * | 3/2020 | Rosca | G06F 16/1873 |
| 2021/0224271 A1 * | 7/2021 | Cuddihy | G06F 16/22 |

OTHER PUBLICATIONS

Khan, Yasar et al., "One Size Does Not Fit AIL Querying Web Polystores", IEEE Access, vol. No. 07, Jan. 17, 2019, Doi: 10.1109/ACCESS .2018.2888601, (pp. 9598-9617, 20 total pages).

Sima, Ana Claudia et al., "Enabling Semantic Queries Across Federated Bioinformatics Databases", BioRxiv, Jun. 28, 2019, DOI: 10.1101/686600, (pp. 1-9, 9 total pages).

* cited by examiner

Nodegroup: this is the input or "query"

```
☐ ?Aircraft            — X
  ☐ AcType : string
  ■ TailNumber : string          Current
  ☐ CurrentLocation :            location
    AircraftLocation
Constraint: tailNumber
          == "demo"
```

☐ ?AircraftLocation  — X
                      ☐ Latitude : double       Latitude and longitude
                      ☐ Longitude : double      marked to be returned 1004 — Nodegroup: this is the input or "query"
202 — (AircraftLocation nodegroup)

Nodegroup for input1

```
☒ ?AircraftUri          — X
  ☐ AcType : string              AircraftUri and tailNumber
  ■ TailNumber : string           Marked to be returned
  ☐ CurrentLocation :
    AircraftLocation
Constraint: tailNumber == "demo"
```

216

214 — SPARQL generated

```
prefix rdf:<http://www.w3.org/1999/02/22-rdf-syntax-ns#>
prefix decisionAidDemo:<http://research.ge.com/decisionAid/
  decisionAidDemo#>
prefix rdfs:<http://www.w3.org/2000/01/rdf-schema#>
prefix generateSparqlInsert:<belmont/generateSparql Insert#>
prefix XMLSchema:<http://www.w3.org/2001/XMLSchema#>
select distinct ?aircraftUri ?tailNumber
                                  FROM <http://graph/name>
where {
    ?aircraftUria decisionAidDemo:Aircraft.
    ?aircraftUri decisionAidDemo:tailNumber ?tailNumber.
    VALUES ?tailNumber {"demo"^^XMLSchema:string }.
}
```

218 — Results: Data for input1

| aircraftUri | tailNumber |
|---|---|
| http://research.ge.com/daDemo/aircraft/data# 3f462e27-ca44-4aa1-a445-60a4965a5603 | demo |

1010 — System configuration concerning aircraft location

- AircraftLocationConfig is a FdcConfig, — 202
- with fdcClass daDemo : AircraftLocation,
- with serviceURL "http://localhost : 12010/daFdcService/aircraftLocation",
- with ingestNodegroupId "daFdcIngestAircraftLocation",
- with input AircraftLocationInput1.

- AircraftLocationInput1 is a FdcInput,
  - with inputIndex 1,
  - with subgraphLink (a FdcInputSubgraphLink
    - with subjectClass daDemo: LocationTrackableAircraft
    - with predicateProp currentLocation
    - with objectClass daDemo:AircraftLocation
  )  } 228

- with param (a FdcParam with columnName "tailNumber", with
  classURI daDemo:Aircraft, with propertyURI daDemo:tailNumber),
- with param (a FdcParam with columnName "aircraftUri", with classURI
  daDemo:Aircraft).

Results: Data for input1 218

| AircraftUri | TailNumber |
|---|---|
| http://research.ge.com/daDemo/aircraft/data#3f462e27-ca44-4aa1-a445-60a4965a5603 | Demo |

Results of location generator 220

| AircraftUri | Latitude | Longitude |
|---|---|---|
| http://research.ge.com/daDemo/aircraft/data#3f462e27-ca44-4aa1-a445-60a4965a5603 | 42.8246 | -73.8859 |

Final query results 302

| TailNumber | Latitude | Longitude |
|---|---|---|
| Demo | 42.8246 | -73.8859 |

Without this invention, the SemTK system would generate this SPARQL query prefix rdf:<http://www.w3.org/1999/02/22-rdf-syntax-ns#>
prefix decisionAidDemo:<http://research.ge.com/decisionAid/decisionAidDemo#>
prefix rdfs:<http://www.w3.org/2000/01/rdf-schema#>
prefix generateSparqlInsert:<belmont/generateSparqlInsert#>
prefix XMLSchema:<http://www.w3.org/2001/XMLSchema#>
select distinct ?tailNumber ?latitude ?longitude
     FROM <http://graph/name>
    where{

?Aircraft a decisionAidDemo:Aircraft.
?Aircraft decisionAidDemo:tailNumber ?tailNumber.
VALUES ?tailNumber { 'demo'^^XMLSchema:string }.

?Aircraft decisionAidDemo:currentLocation ?AircraftLocation.
 ?AircraftLocation decisionAidDemo:latitude ?latitude.
  ?AircraftLocation decisionAidDemo:longitude ?longitude.

}

The query would return nothing because there would be no data matching AircraftLocation in the knowledge graph.

DistanceConfig is a FdcConfig, ~202
    with fdcClass daDemo:Distance,
206 — with serviceURL "http://localhost:12010/daFdcService/distance",
208 — with ingestNodegroupId "daFdcIngestDistance",
    with input DistanceInput1,
    with input DistanceInput2, ~210

DistanceInput1 is a FdcInput,
    with inputIndex 1,
    with subgraphLink (a FdcInputSubgraphLink
        with subjectClass daDemo:Distance
        with predicateProp location1,
        with objectClass daDemo:Location
    )

212 {
    with param (a FdcParam with columnName "latitude1", with classURI daDemo:Location, with propertyURI daDemo:latitude),
    with param (a FdcParam with columnName "longitude1", with classURI daDemo:Location, with propertyURI daDemo:longitude),
    with param (a FdcParam with columnName "location1", with classURI daDemo:Location).

DistanceInput2 is a FdcInput,
    with inputIndex 2,
    with subgraphLink (a FdcInputSubgraphLink
        with subjectClass daDemo:Distance,
        with predicateProp location2,
        with objectClass daDemo:Location
    )
    with param (a FdcParam with columnName "latitude2", with classURI daDemo:Location, with propertyURI daDemo:latitude),
    with param (a FdcParam with columnName "longitude2", with classURI daDemo:Location, with propertyURI daDemo:longitude),
    with param (a FdcParam with columnName "location2", with classURI daDemo:Location).

Nodegroup for input1

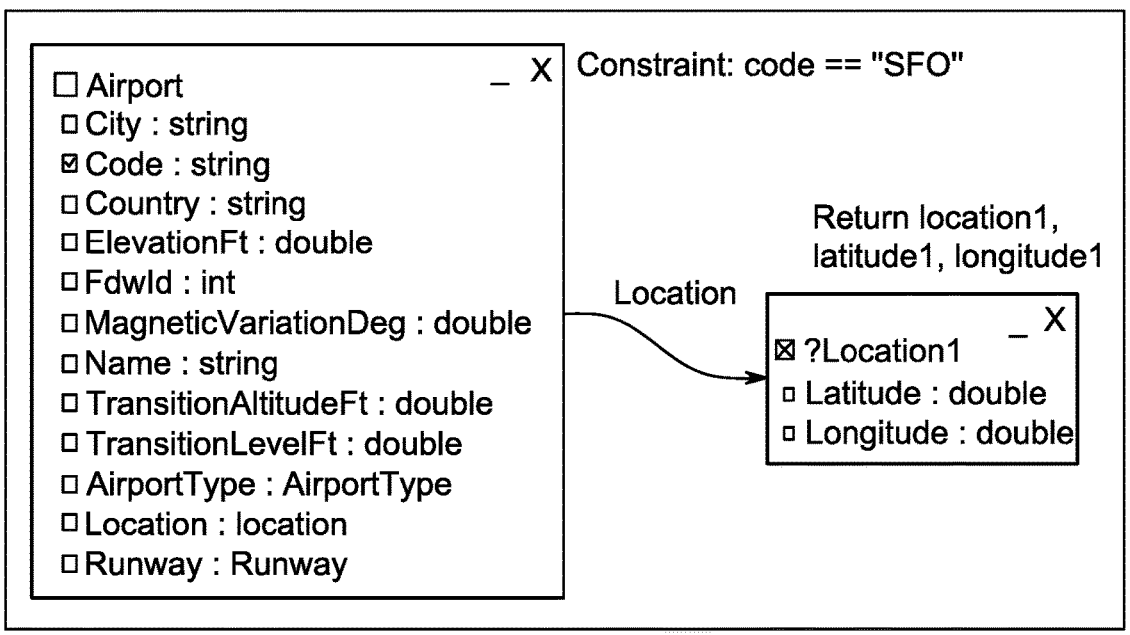

SPARQL generated

1002 prefix rdf:<http://www.w3.org/1999/02/22-rdf-syntax-ns#>
prefix decisionAidDemo:<http://research.ge.com/decisionAid/decisionAidDemo#>
prefix rdfs:<http://www.w3.org/2000/01/rdf-schema#>
prefix generateSparqlInsert:<belmont/generateSparqlInsert#>
prefix XMLSchema:<http://www.w3.org/2001/XMLSchema#>
select distinct ?location1 ?latitude1 ?longitude1
           FROM<http://graph/name>
where{
    ?Aircraft a decisionAidDemo:Aircraft.
    ?Aircraft decisionAidDemo:code ?code.
    FILTER regex(?code, "SFO").
    ?Airport decisionAidDemo:location ?location1.
        ?location1 decisionAidDemo:latitude ?latitude1.
        ?location1 decisionAidDemo:longitude ?longitude1.
}

FIG. 6B

Input data generated by distanceInput1

| Location1 | Latitude1 | Longitude1 | |
|---|---|---|---|
| http://research.ge.com/decisionAid/runways#694ca8d2-fe38-48c1-b9e8-5bf857e96e62 | 37.6191 | -122.375 | ~702 |

Input data generated by distanceInput2

| Location2 | Latitude2 | Longitude2 | |
|---|---|---|---|
| http://research.ge.com/decisionAid/runways#6052caa4-f871-4e07-9f63-0f9cec62002f | 40.6925 | -74.1687 | ~704 |

Results from distance generator external service — 706

| Location1 | Location2 | DistanceNm |
|---|---|---|
| http://research.ge.com/decisionAid/runways#694ca8d2-fe38-48c1-b9e8-5bf857e96e62 | http://research.ge.com/decisionAid/runways#6052caa4-f871-4e07-9f63-0f9cec62002f | 2224.39 |

302

| DistanceNm |
|---|
| 2224.39 |

FIG. 7

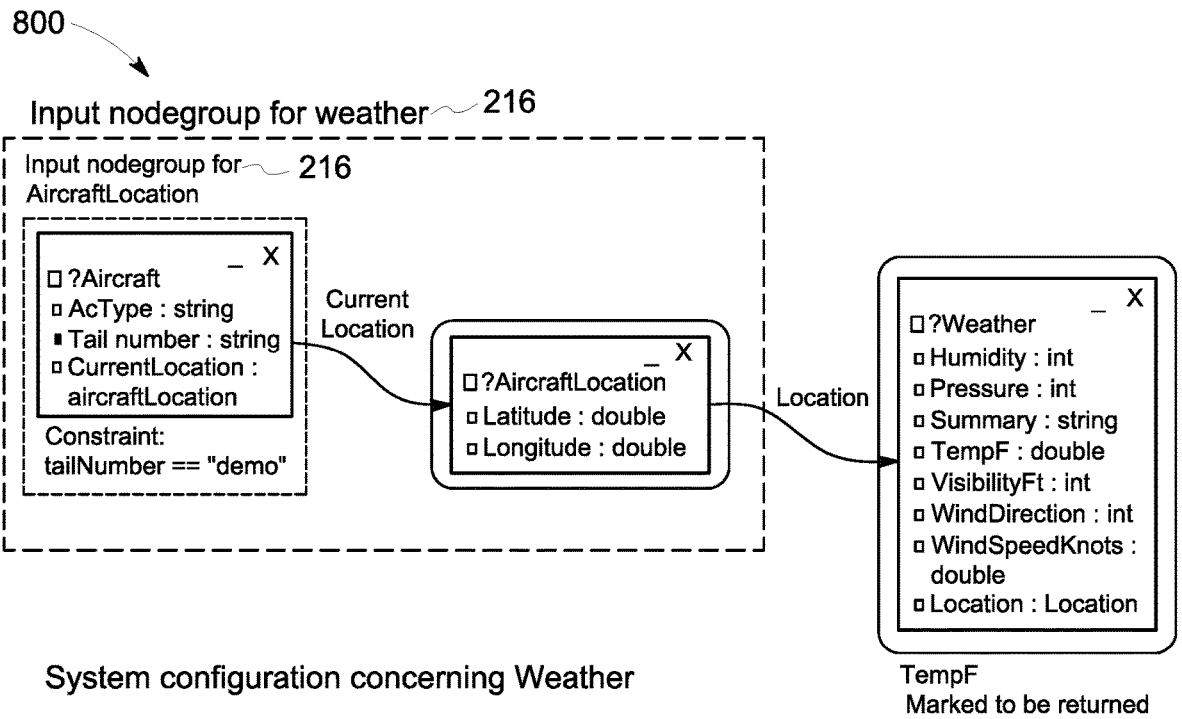

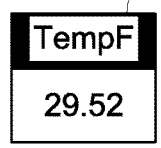

System configuration concerning Weather

WeatherConfig is a FdcConfig, 202
    with fdcClass daDemo : Weather,
    with serviceURL "http://localhost:12010/daFdcService/weather",
    with ingestNodegroupId "daFdcIngestWeather",
    with input WeatherInput1.

WeatherInput1 is a FdcInput,
    with inputIndex 1,
    with subgraphLink (a FdcInputSubgraphLink
        with subjectClass daDemo:Weather
        with predicateProp location
        with objectClass daDemo:Location
    )
    with param (a FdcParam with columnName "latitude", with classURI daDemo:Location, with propertyURI daDemo:latitude),
    with param (a FdcParam with columnName "longitude", with classURI daDemo:Location, with propertyURI daDemo:longitude),
    with param (a FdcParam with columnName "location", with classURI daDemo:Location).

FIG. 8

SYSTEM AND METHOD FOR PERFORMING SEMANTICALLY-INFORMED FEDERATED QUERIES ACROSS A POLYSTORE

BACKGROUND

Data is stored in varying locations and formats, for reasons technical and organizational. A knowledge graph is a programmatic way to respond to a query by graphically modeling a knowledge domain with the help of subject-matter experts, data interlinking, and machine learning algorithms. Connecting databases in a meaningful way may help users gain context within the existing knowledge base. As a result of the graphical properties, the knowledge graph may easily connect data items as they are added to a data pool, and links between data in the data pools may be easily traversed to discover how remote parts of a domain relate to each other. Further, knowledge graphs are typically semantic in that the meaning of the data is encoded alongside the data in the graph in the form of the ontology (e.g., the knowledge graph is a single place to find the data and understand what it's all about).

However, semantic web technologies are not optimized for storage of low dimensional large data like time series, for images and large files, etc. Ontology-Based Data Access (OBDA) is a technique whereby meta-data is about multiple non-semantic-web data sources stored in the semantic web and used to retrieve external data. In its current state, OBDA technology allows a query to retrieve information from a small number (often one) of external sources and without interaction between multiple sources of external data.

For some questions that answering systems are solving, not only do the results of data from one external source need to affect the retrieval from other sources in the same query, but some "data sources" may actually be computations rather than data retrieval, which may be problematic for conventional techniques as it may involve expensive and time-consuming processes that may require moving the data or may require manually intensive steps to obtain the data.

It would be desirable to provide systems and methods to store and retrieve data from different data stores in an automatic and accurate manner.

SUMMARY

According to some embodiments, a computer-implemented method includes receiving a node group at an integration module, wherein the node group includes one or more requests for internal data and external data, wherein internal data is data stored in an internal datastore and external data is data stored outside of the internal data store; identifying in a configuration data, one or more meta-data nodes from the node group, wherein each meta-data node indicates a request for external data; retrieving the internal data via execution of an internal data query; determining an order of execution for the one or more meta-data nodes; executing a first meta-data node based on the determined order to generate a first result; ingesting the first result into a semantic datastore; and executing a query to generate a final result, wherein the query includes the retrieved internal data and the ingested first result.

According to some embodiments, a system includes an integration module; one or more external data stores storing external data, wherein external data is data stored outside of an internal data store; a memory storing program instructions: and an integration processor, coupled to the memory, and in communication with the signature module and operative to execute program instructions to: receive a node group at the integration module, wherein the node group includes one or more requests for internal data and external data, wherein internal data is data stored in an internal datastore; identify in a configuration data one or more meta-data nodes from the node group, wherein each meta-data node indicates a request for external data; retrieve the internal data via execution of an internal data query; determine an order of execution for the one or more meta-data nodes; execute a first meta-data node based on the determined order to generate a first result; ingest the first result into a semantic datastore; and execute a query to generate a final result, wherein the query includes the retrieved internal data and the ingested first result.

According to some embodiments, a non-transitory computer-readable medium storing instructions to be executed by a processor to perform a method including: receiving a node group at an integration module, wherein the node group includes one or more requests for internal data and external data, wherein internal data is data stored in an internal datastore and external data is data stored outside of the internal data store; identifying in a configuration data, one or more meta-data nodes from the node group, wherein each meta-data node indicates a request for external data; retrieving the internal data via execution of an internal data query; determining an order of execution for the one or more meta-data nodes; executing a first meta-data node based on the determined order to generate a first result; ingesting the first result into a semantic datastore; and executing a query to generate a final result, wherein the query includes the retrieved internal data and the ingested first result.

Some technical effects of some embodiments disclosed herein are improved systems and methods to automatically store metadata about the location of different data from different data stores and the parameters and services required to retrieve this data. One or more embodiments may use semantic technology and a service layer to store the metadata, parameters and services. Embodiments may use a node group visual query subgraph representation to reason over dependencies between data sources to build and execute sub-queries in multiple languages and then ingest the queries into a temporary semantic graph. Next, one or more embodiments may generate a final version of a query over the cached data provided by execution of the sub-queries to retrieve a result to an initial query. One or more embodiments automates the accessing of multiple data sources and use of sub-queries, and stores the knowledge of expert data scientists in a semantic web as metadata. As used herein, "semantic web" refers to w3c standard web technologies related to OWL, RDF and SPARQL. Embodiments then use that metadata to execute the queries accessing multiple data sources seamlessly.

One or more embodiments provide for launching multiple queries to external datastores (e.g., data stores outside of an internal data store), caching the results and executing a final query over all the data. The final query as well as any intervening sub-query, may be in SPARQL query language, or any other suitable language. One or more embodiments may use a node-group visual query specification to determine an efficient order to execute the multiple external queries so that each is constrained by as much upstream knowledge as possible. Further, one or more embodiments may use an ingestion process to cache temporary data, provided by the execution of the multiple external queries, in a semantic web. As used herein, the terms "semantic web", "semantic data store" and "knowledge graph," may be used interchangeably. Also, as used herein, the terms "data source" and "data store" may be used interchangeably.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

BRIEF DESCRIPTION OF THE DRAWINGS

FIG. 2 is first non-exhaustive example of a node group according to embodiments.

FIG. 3 is tables associated with the first non-exhaustive example according to embodiments.

FIG. 4 is an example of a query according to embodiments.

FIGS. 5A and 5B is a second non-exhaustive example of a node group according to embodiments.

FIGS. 6A and 6B are associated with the second non-exhaustive example of a node group according to embodiments.

FIG. 7 is tables associated with the second non-exhaustive example according to embodiments.

FIG. 8 is a third non-exhaustive example of a node group according to embodiments.

DETAILED DESCRIPTION

Figure 1:
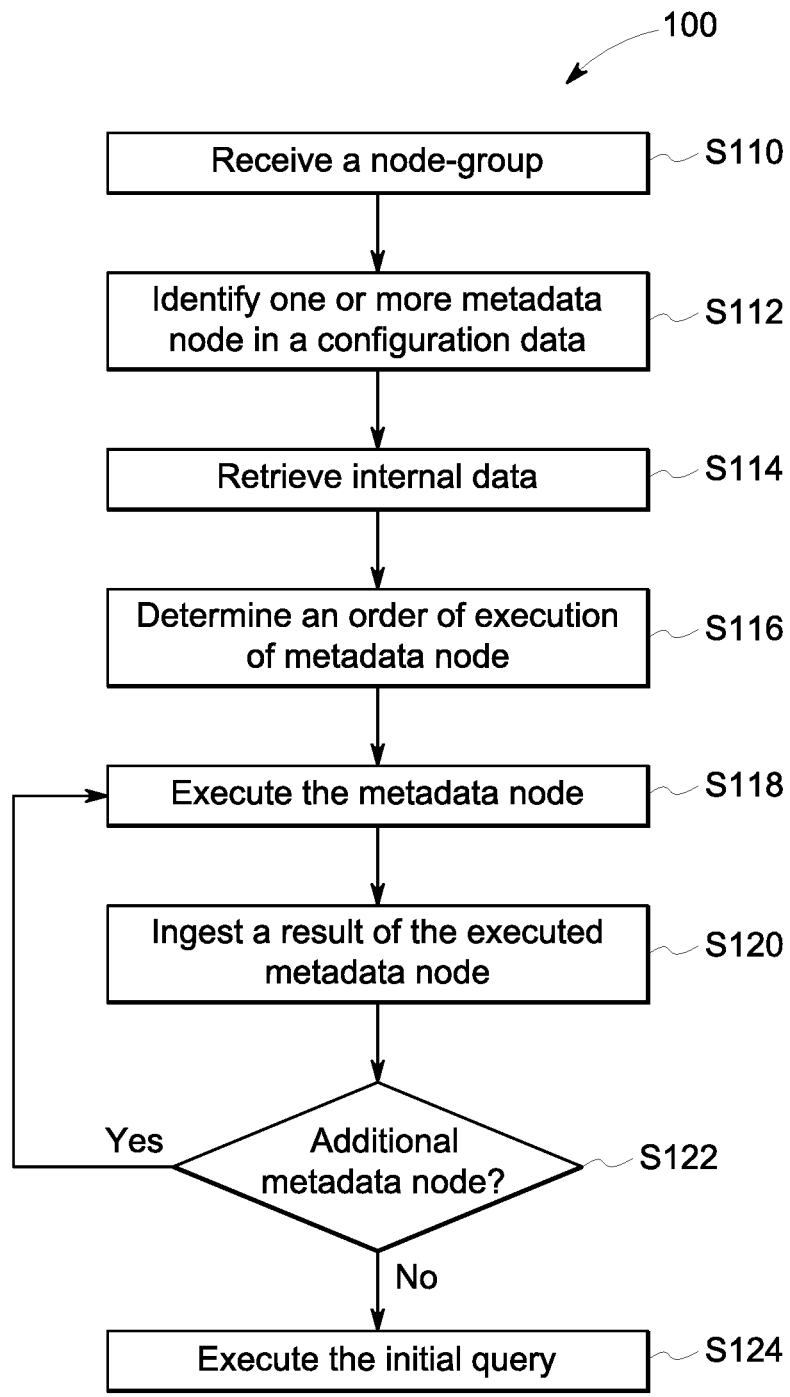
FIG. 1 is a method according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Semantic web technology/knowledge graph technology is used to store data and answer questions. These technologies are good for exploration of domains and are automatic, making it easier to create queries than using a relational database technology. A user may want to connect to data that cannot be stored locally for various reasons, including, but not limited to, the format of the data, the dynamic aspect of the data (e.g., temperature data or location of an aircraft data, that is constantly changing), and the volume of data (e.g., the distance between every latitudinal and longitudinal point). Conventionally, to obtain this non-locally-stored data, a user has to know all the data sources and to write all the calls/requests for data, which is manually intensive, and requires a particular querying expertise to manually answer questions that require data from across many locations and formats.

To address these concerns, one or more embodiments provide an integration module. To resolve an initial user query, the integration module may create one or more sub-queries, execute the sub-queries to retrieve data from multiple external data stores (e.g., outside of the local data stores) and internal data stores, incorporate the retrieved data into a knowledge graph, and then execute the initial user query based on the data in the knowledge graph. As a non-exhaustive example, which will also be referenced below, consider the initial user query of: get the outside temperature at aircraft 2XY. In order to get the outside temperature at the aircraft location, the integration module needs to first know the location of the aircraft. To that end, the integration module may generate a first sub-query to retrieve the location of the aircraft from an external data source. The location may be in terms of latitude and longitude. Then, the integration module may generate a second sub-query to retrieve the temperature at the given location. The integration module may supply the latitude and the longitude of the aircraft to an external weather data service to retrieve the temperature at the given latitude and longitude. After the integration module retrieves the results of the sub-queries (e.g., location and temperature), the integration module may execute the initial user query to output the outside temperature at aircraft 2XY.

Turning to FIGS. 1-10, a system 1000 and diagrams of examples of operation according to some embodiments are provided. In particular, FIG. 1 provides a flow diagram of a process 100, according to some embodiments. Process 100, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 1000 is conditioned to perform the process 100 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Prior to the start of the process 100, an initial user query 1002 is received at the system 1000. The initial user query 1002 is manipulated by a dispatcher (not shown) to generate a node-group 1004. The node-group 1004 is a data structure having multiple nodes 1006. Each node 1006 in the node-group 1004 represents a class variable in a query, and has a unique name and a list of properties. In one or more embodiments, each node has a class and a list of object properties (those whose range is another class) and data properties (those whose range is data such as integer or string). All properties within a connected domain may be displayed in a knowledge graph 1008, regardless if they are being used in a query or not. A connection may include a URL and graph names of query endpoints that store the ontology information and the data. It is noted that in some embodiments, the node-group 1004 may be created by a user prior to the start of process 100. In one or more embodiments, the node-group may be represented as a visual query subgraph 1008 ("knowledge graph").

Additionally, prior to the start of the process 100, system configuration data 1010 (namespace) is created and input to the system 1000. In one or more embodiments, a configuration graph of the configuration data is stored in a semantic web triplestore. The system configuration data 1010 may include parameters and initial settings for the system 100. In one or more embodiments, the configuration data 1010 includes a plurality of URLs that may be used, by a query at run-time, to retrieve data from one or more external data stores 1012. The configuration data 1010 may include 1. The name of the class that is actually external data; 2. A URL (location of a service to generate/retrieve the data); 3. The name of a node group that can be used to ingest the results; 4. One or more input tables for the data service, each with: a. a path in the node group from the external data node to a key node in the node group subgraph that may be used to generate the input, and b. a list of parameters, where each parameter includes the name of the parameter (e.g., table column name) and the class and optional property that may be queried to produce the data. As used herein, an "external data store" may refer to a data store (e.g., relational database, time series store, document store, computation service, etc.) that is stored outside of the system 1000.

Figure 10:
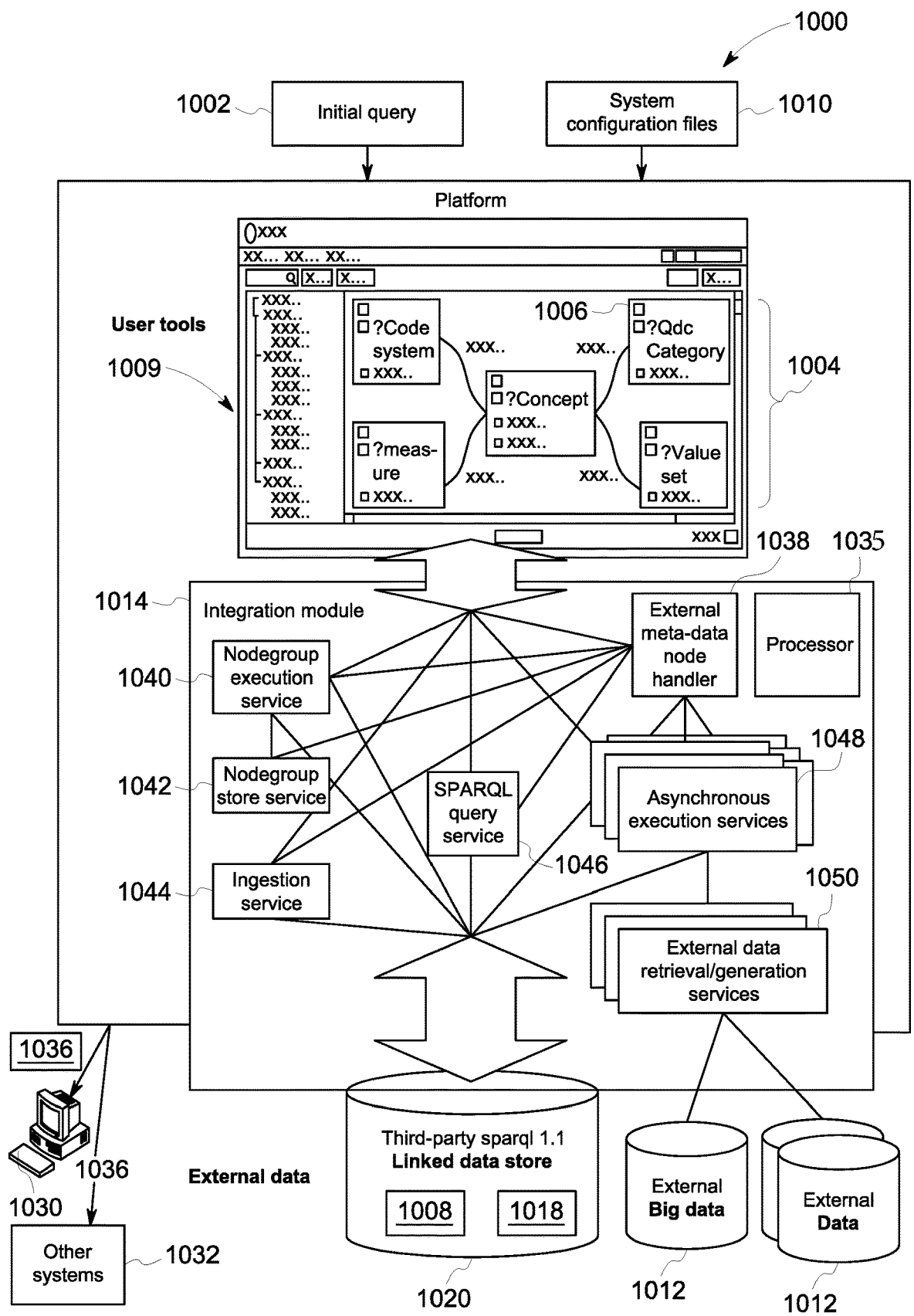
FIG. 10 is a block diagram of a system according to some embodiments.

Initially, at S110, a node-group 1004 is received at an integration module 1014 of the system 1000. The node-group 1004 is the input or "query" and includes one or more requests for internal data 1018 that may be input via a user interface (UI) 1009. In one or more embodiments, the internal data 1018 is stored in a linked datastore 1020 which may be considered an "internal" data store. In one or more embodiments, the node-group 1004 may be stored in a knowledge graph 1008 (FIG. 10).

FIG. 2 provides a non-exhaustive example and will be described with respect to the process 100. In this example, the node-group 1004 representing the input/query received at S110 is "Find an aircraft location." It is noted that AircraftLocation is dynamic, as an aircraft may travel and so the aircraft's location may change. As described above, dynamic data 1013 may be stored in an external data store 1012, and is not stored in the knowledge graph 1008.

It is further noted that a conventional process may generate a query 400, as shown in FIG. 4, to retrieve a given aircraft location. However, such a query may return nothing because there is no data matching AircraftLocation in the knowledge graph, as this data is stored in an external data store.

Next, at S112, one or more meta-data nodes 202 from the node-group 1004 are identified in configuration data 1010. The meta-data nodes 202 may be somehow marked in the configuration data 1010 to indicate external data is needed. For example, the meta-data node 202 may be marked as "config", or any other suitable marking. Each meta-data node 202 indicates a request for external data 1013. In one or more embodiments, the integration module 1014 receives the node-group 1004 and then accesses the configuration data 1010 to determine whether any of nodes 1006 in the node-group 1004 are listed in the configuration data 1010 as having data stored in the external data store 1012.

The configuration data 1010, may, in one or more embodiments, list a class 204 which indicates external data, a serviceURL 206, an ingestNodegroupID 208 and an input 210. The serviceURL 206 indicates the location of the external data store 1012. The ingestNodegroupID 208 indicates the name of the location to store the data after it has been retrieved from the external data store 1012. Input 210 indicates the data that is input to the serviceURL 206. [In one or more embodiments, the input 210 may need to be retrieved from another datastore (internal or external), which may also be described in the configuration data.

Continuing with the example in FIG. 2, the configuration data 1010 indicates that "Aircraft location" data is stored in the external data store 1012 by the fact that "Aircraft location" is listed with an external marking. In the non-exhaustive example shown herein, the external marking is "fdc". As shown herein, the aircraft location external data store is located at the serviceURL 206: http://localhost:12010/daFdcService/aircraftLocation". Further, when the data is retrieved from the serviceURL 206, the ingestNodegroupId 208 "daFdcIngestAircraftLocation" is used to ingest the data into a temporary graph. The input 210 for the serviceURL 206 in this example is AircraftLocationInput1. It is further noted that, per the configuration data 1010, the input 210 (AircraftLocationInput1) to the serviceURL 206 is retrieved from an internal data store 1020. The internal data storage consists of internal data and a model that indicates what the internal data is. It is noted that when external metadata node (e.g., the result from the external source) is ingested to the knowledge graph, the external metadata node is now an actual node that is part of the knowledge graph, and when the original query is executed, the external source does not need to be accessed to retrieve this data. The configuration data 1010 indicates that to retrieve the AircraftLoationInput1, certain parameters 212 are needed. In this non-exhaustive example, the parameters "tailNumber" and "aircraftUri" are needed. In one or more embodiments, the parameter name may indicate a columnName in a data store (e.g., internal or external). The tailNumber is one of the properties of the node-group, and is the identification for the particular aircraft that is the subject of the node-group 1004. The subject of the node-group 1004 may act as one of the constraints of the initial query, as the query is retrieving information about this particular subject. In this non-exhaustive example, the tailNumber is "demo". The Uniform Resource Identifier (URI) may be the identifier (e.g., at least one of alpha, numeric, symbolic) for the subject in the internal data store 1020. In this example, tailNumber "demo" may be internal data 1018 linked in the internal data store 1020 to a particular aircraftUri. In one or more embodiments, the tailNumber and Uri may be stored in the internal data store 1020, or they may be retrieved, as the process described herein may be applied recursively to the node-group 1004.

Turning back to the process 100, at S114, the internal data 1018 is retrieved from the internal data store 1020. In one or more embodiments, the integration module 1014 may determine, based on the configuration data 1010 which data it can retrieve from an internal data store 1020. The integration module 1014 may then generate an input node group 216 and then generate and execute an internal data query 214 based on that input node group 213 to retrieve the internal data 1018 from the internal data store 1020. As described above, while the examples described herein are with respect to queries in the SPARQL language, any suitable query language may be used. The queries described herein may be generated by any suitable query service 1022. It is noted that, as used herein, "sub-query" may refer to any query that is not the initial query and that is used to generate data to be used by the initial query.

Turning back to FIG. 2, the integration module 1014 may locate a "currentLocation" link in the node group and establish "Aircraft" as the head node in the generated input-node-group 216 to retrieve the AircraftLocationInput1 ("Input1"). The internal data query 214 generated by the integration module 1014 may set tailNumber to be returned as "tailNumber"; set Aircraft to be returned as "aircraftURI"; and remove all nodes on the other side of "currentLocation" (in this case, "AircraftLocation"). Using the constraint tailNumber="demo," the integration module 1014 may execute ("run") this internal data query 214 to return the aircaftUri for tailNumber="demo". The returned/retrieved data from the execution of the node-group may be stored in a table 218, as shown in FIG. 2. It is noted that the data returned by each sub-query may be returned in the form of a table or other suitable storage medium, including but not limited to, text file, JSON, etc.

Next, in S116, the integration module 1014 may determine an order of execution for the meta-data nodes 202. It is noted that, steps S114 and S116 may be reversed. For example, when more than one meta-data node 202 is identified in the configuration data 1010, the integration module 1014 may determine whether the execution of a first meta-data node uses data that is the result of execution of a second meta-data node. In the non-exhaustive example of temperature outside of an aircraft, described above, two meta-data nodes 202 may be aircraft location and temperature. The integration module 1014 may analyze the configuration data 1010 and determine that the temperature meta-data node needs an input of latitude and longitude, and that the result of execution of the aircraft location meta-data node is latitude and longitude. As such, the integration module 1014 may order the execution of the aircraft location meta-data node before execution of the temperature meta-data node. It is noted that, in one or more embodiments, there may be only one meta-data node (e.g., the non-exhaustive example in FIG. 2), and as such the order of execution for this meta-data node may be first.

Then in S118, the meta-data node 202 is executed based on the determined order of execution of meta-data nodes to retrieve the data from the appropriate external data store 1012, and generate a meta-data node result 220.

Continuing with the non-exhaustive example in FIG. 2, the integration module 1014 sends the table 218, including the aircraftURI, as a request to the serviceURL 206 listed in the configuration data 1010 for the location information for the aircraft associated with the aircraftURI. In this case, the aircraftURI is sent to http:/localhost:12010/daFdcService/aircraftLocation. The location generator service 1024 ("external service") accessible via the serviceURL retrieves the requested data, and returns the location of the requested aircraft in the form of a latitude coordinate and a longitude coordinate ("meta-data node result" 220).

After the meta-data node result 220 is generated, and returned to the integration module 1014 as a table (FIG. 2), it is ingested into the internal data store 1020 (FIG. 10), and may be referred to as "a semantic/results data store" in S120. Ingesting the meta-data node result 220 creates a location object, based on the ingestNodegroupID 208 in the configuration data 1010 attached to the given input to the serviceURL with the given meta-data node result in a temporary graph in the semantic data store 1026 that may be accessed by the original query 1002.

In one or more embodiments, the meta-data node results 220 may be in a comma-separated values (CSV) file format. Typically, this format is used to store tabular data (numbers and text). To ingest the meta-data node results 220 in a CSV file format into a semantic data store/knowledge graph, one or more embodiments may include a data ingestion service 1028. The data ingestion service 1028 may execute a process whereby the service 1028 may receive the sub element results in the CSV format and convert the data into Resource Description Framework (RDF) triples. As used herein, an RDF triple 228 (which may also be referred to as a semantic triple), is an expression that defines a way in which a relationship between objects can be represented. There are three parts to a triple: Subject 222, Predicate 24 and Object 226. A predicate 224 relates subject 222 to object 226. Continuing with the example in FIG. 2, for the AircraftLocation Input 1, the subjectclass 222 is daDemo:LocationTrackableAircraft, the predicateProp 224 is currentlocation, and the objectClass 226 is daDemo:AircraftLocation. In one or more embodiments, triplification (i.e., converting the CSV into an RDF triple) and ingestion of the data may take place in three steps. In the first step, a new node-group 1030 ("ingestion node-group") may be constructed to define the structure of the triples to be generated. In one or more embodiments, a structure of the ingestion node-group 1030 may be the same as described above for creating the queries, except that many clauses not related to the structure of the ingestion node-group may be ignored. In the second step, data/columns from the CSV (or table) may be mapped to one or more attributes in the constructed ingestion node-group 1030. It is noted that, in one or more embodiments, transformations are available, allowing the column values in the CSV (or table) to be altered before being assigned. Free text values may, in one or more embodiments, be added to the mapping as well. In the third step, the mapping is applied to the input data, and this is the execution of the ingestion step (e.g., movement of data into the knowledge graph). In one or more embodiments, when the ingestion process is executed, one copy of the node-group may be generated for each line of input data. The data may be type-checked based on the ontology and then added to the node-group. In one or more embodiments, a query-generation engine provided by the query generator service 1022 (e.g., SPARQL-generation engine) may build an INSERT statement and execute it against the data connection to add the data to the knowledge graph 1008. It is noted that, in one or more embodiments, after an ingestion node-group is populated with input data, but before the INSERT query is generated, the ingestion node-group may be pruned such that any leaf node with no data is removed. It is further noted that occasional "empty" objects may remain (are not pruned) when needed to serve as intermediate steps in a path between classes across the ingested data.

Continuing with the non-exhaustive example in FIG. 2, based on the ingestNodegroupID, the meta-data node result 220 including the aircraft latitude and longitude coordinates is ingested into a knowledge graph 1008 ("semantic datastore") using the ingestion template named "daFdcIngestAircraftLocation". The ingestion process creates an object, and in this particular example, the ingestion process creates a location object attached to the given aircraftURI with the given latitude and longitude in a temporary graph (e.g. the knowledge graph).

Turning back to the process 100, next in S122, it is determined whether any meta-data nodes 202 remain. When it is determined in S122 that additional meta-data nodes remain (e.g., have not been executed), the process 100 returns to S118, to execute the next meta-data node 202 in the determined order. When it is determined in S122 that no additional meta-data nodes remain for execution, the process 100 proceeds to S124 and the initial query 1002 is executed to generate a final result 302 (FIG. 3). It is noted that in one or more embodiments, when the initial query has more than one meta-data node, the results of each sub-query are ingested before the next sub-query is executed. In one or more embodiments, execution of the initial query includes the generated internal data and any ingested results.

Continuing with the non-exhaustive example in FIG. 2, the initial query 1002 shown in FIG. 4 is executed, and the ingestion module 1014 provided in one or more embodiments, is able to access the knowledge graph 1008 and provide the data matching "AircraftLocation", namely, the latitude and longitude provided in the Results of location generator table 218 in FIG. 2. Execution of the initial query 1002 generates the final result 302 to the initial query 1002. The final result 302 may be stored in a table as shown in FIG. 3. In one or more embodiments, the final result 302 may be output to the user 1030 or transmitted to another system 1032 for further analysis. It is noted that, in one or more embodiments, the final result 302 may be at least one of temporarily stored or permanently stored. The results are temporarily stored so that the final complete query may be executed.

Figure 5A:
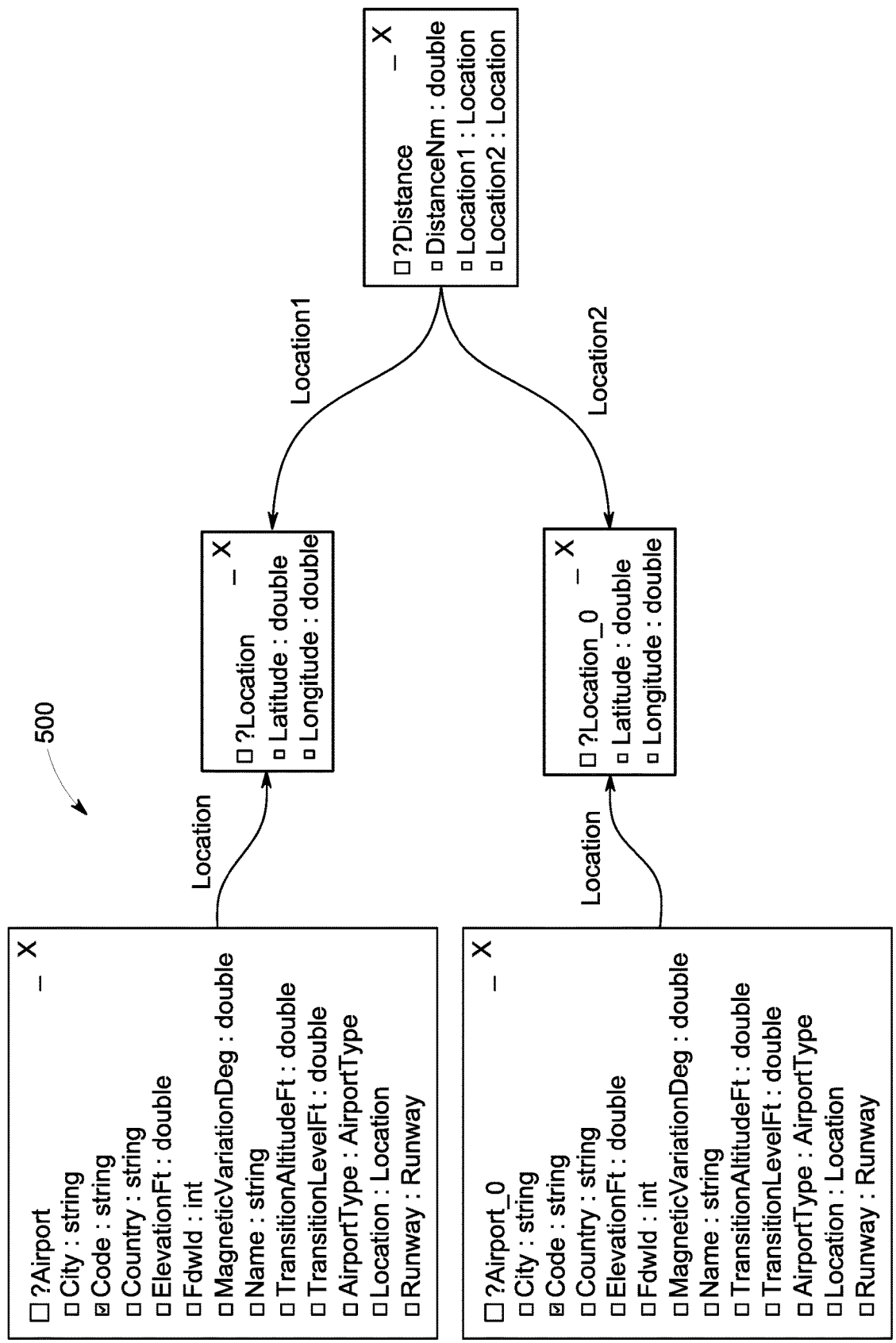
Figure 6A:
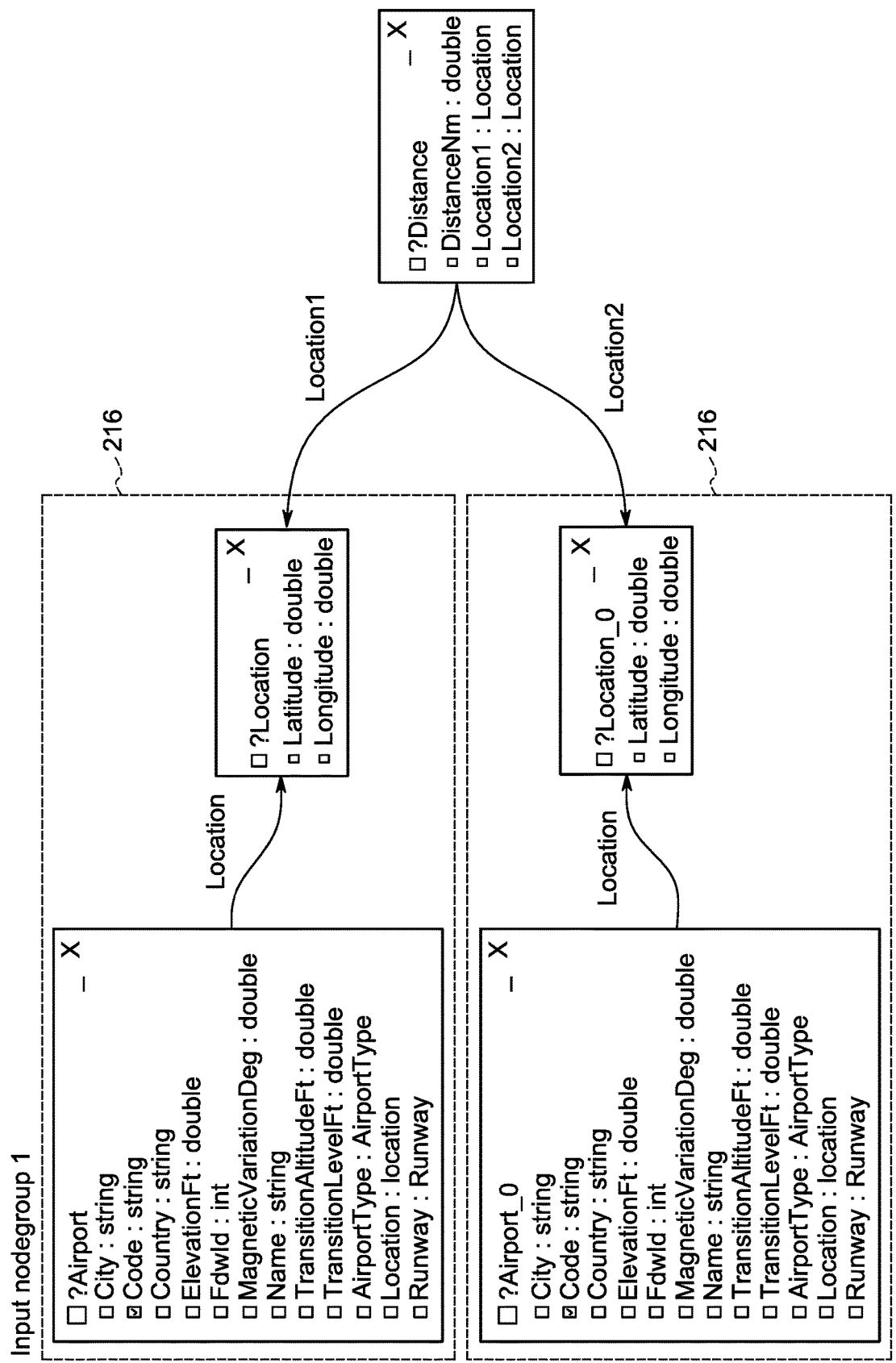
Figure 9:
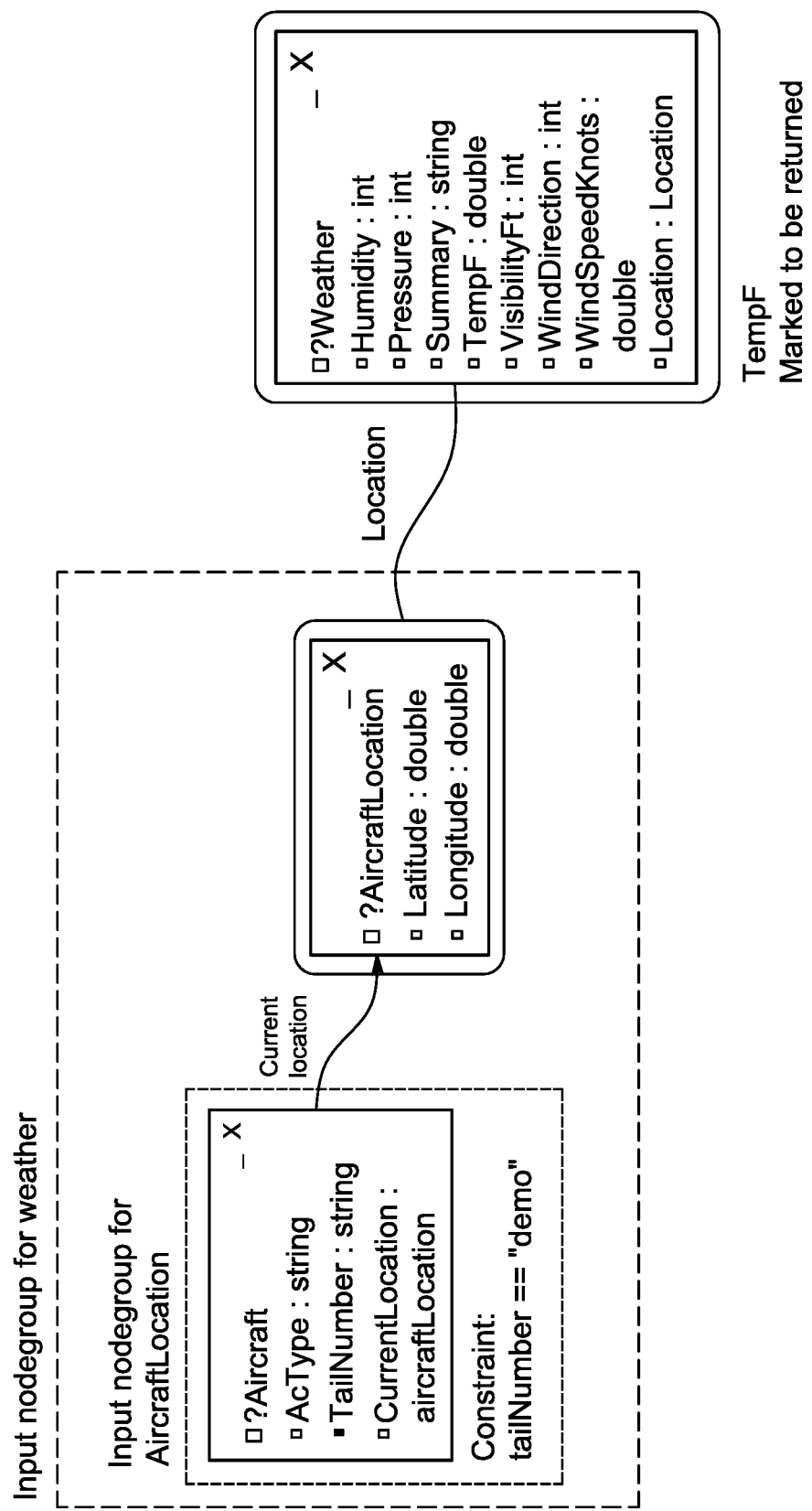
FIG. 9 is associated with the third non-exhaustive example according to some embodiments.

Turning to FIGS. 5A/5B, another non-exhaustive example is provided. This example relates to multiple inputs to an external data store, and will now be described with respect to the process 100 in FIG. 1. In this example, the initial query 1002 is to determine a distance between airports, and in particular between San Francisco International Airport (SFO) and Newark Liberty International Airport (EWR). Unlike the aircraft described above with respect to FIG. 2, the airport locations are static, and are a different type of "location." The location of the airports may be internal data 1018 that is already stored in the internal data store 1020 which is accessible by the knowledge graph 108. However, a distance between every point is not stored. As described above, to store a distance between every latitude and longitude point may be too much data to store. It is further noted that distance between two points may use two sets of input: location1 and location2, and generate a cross-product.

With respect to the process 100, the node-group 500 is received in S110, where the node-group represents the initial query 1002 of the distance between SFO and EWR. The integration module 1014 then identifies one or more meta-data nodes 202 in a configuration data 1010 in S212. In this example, the configuration data 1010 indicates that "Distance" data is stored in the external data store 1012. The distance external data store is located at the serviceURL 206: http://localhost:2010/daFdcService/distance. When the data is retrieved from the serviceURL 206 it is stored in the ingestNodegroupID 208 "daFdcIngestDistance." The input 210 for the serviceURL 206 in this example is DistanceInput1 and DistanceInput2. It is further noted that, per the configuration data, the input 210 (DistanceInput1 and DistanceInput2) to the serviceURL 206 is retrieved from at least one internal data store 1020.

The configuration data 1010 indicates that to retrieve the DistanceInput1 and DistanceInput2, certain parameters 212 are needed. In this non-exhaustive example, the parameters latitude1, longitude1 and location1 are needed for the DistanceInput1 and the parameters latitude2, longitude2 and location2 are needed for the DistanceInput2. This internal data 1018 is retrieved in S114. In this example, instead of one input node-group 216 (as described with respect to the example in FIG. 2), two input node-groups 216 (for the "internal data queries" 214) may be generated by the integration module 1014, one for each configuration: DistanceInput1 and DistanceInput 2. In one or more embodiments, the integration module 1014 may generate an internal data query1 214 associated with one input node-group 216 to retrieve the latitude1, longitude1 and location1 from the first internal data store 1020 and may generate an internal data query2 associated with another input node-group 216 to retrieve the latitude2, longitude2 and location2 from the second internal data store 1020. It is noted that the data retrieved by internal data query 1 and internal data query2 may be retrieved from a same or different internal data store.

In this non-exhaustive example, the constraints on airport codes (SFO and EWR) for each of the internal data queries may be kept unchanged. The internal data query1 214 generated by the integration module 1014 may set "latitude1" and "longitude1" to be returned as "location1" and "latitude2" and "longitude2" to be returned as "location2". Using the latitude and longitudes, the integration module 1014 may execute each internal data query to return a respective latitude/longitude for each internal data query. The returned/retrieved data from the execution of each of these input node-groups 216 may be stored in a respective table 702, 704, as shown in FIG. 7. Particularly, as shown in FIG. 1, loaction1, latitude1, and longitude1 are stored in the distance input1 table 702, and the location2, latitutde2, and longitude 2 are stored in the distanceinput2 table 704.

Then, in S116, the integration module 1014 may determine an order of execution for the meta-data nodes 202. In this non-exhaustive example, there is only one meta-data node ("distance").

In S118, the meta-data node 220 is executed to generate a meta-data node result 220. The integration module 1014 sends both table 702 including the DistanceInput1, and table 704 including DistanceInput2, as a request to the serviceURL 206 http://localhost:12010/daFdcService/distance) listed in the configuration data 1010. The distance generator external service 1024 accessible via the serviceURL, retrieves the requested data, and returns the distance between the two airports (SFO and EWR)—sub element result 220 (distanceNm)—as a table 706 ("results from distance generator external service" to the integration module. It is noted that, in one or more embodiments, the service accessed by the serviceURL may manipulate the inputs to generate an output (distance in this example), prior to returning the output to the requestor (e.g., integration module).

The meta-data node result 220 is then ingested into a semantic data store 1008 in S120. In this non-exhaustive example, the ingestion process per the ingestion service 1028 ingests the sub element result 220 (distance) into the knowledge graph 1008 using the ingestion template named "daFdcIngestDistance," per ingestNodegroupID in the configuration data. This creates a Distance instance object (ingestion node: ingestNodegroupID "daFdcIngestDistance") in the knowledge graph 1008 that is linked to location1 and location2, and has a distanceNm of 2224.39. Continuing with this example, it is determined in S122 that no meta-data nodes remain, the process 100 proceeds to S124, and the initial query 1002 (the distance between SFO and EWR) is generated, via the query generator service 1022 and then executed by the integration module 1014 to generate a final result 302 (2224.39). In one or more embodiments, execution of the initial query 1002 includes the generated internal data (location of SFO, location of EWR) and ingested results. It is noted that the initial query 1002 is the query that is sent into the system, which, it is noted, will also be the final query executed.

Turning to FIG. 8, another non-exhaustive example is provided. This example relates to chaining multiple external data stores, and will now be described with respect to the process 100 in FIG. 1. In this example, the initial query 102 is to determine weather, and in particular a temperature, outside of an aircraft. As above, the aircraft locations are dynamic and may be stored in an external data store, and weather is also dynamic, and may be stored in an external data store.

With respect to the process 100, the node-group 800 is received in S110, wherein the node-group represents the initial query 1002 as: the temperature at an aircraft location. The integration module 1014 then identifies two meta-data nodes in the configuration data 1010 in S212. In this example, the two meta-data nodes are: aircraft location 202 and weather 202.

data node result 220 (output of the AircraftLocation meta-data node) is the Aircraft location output from the location generator external service 1024, as shown in table 220 in FIG. 3: latitude 42.8246 and longitude −73.8859. This first meta-data node result 220 is ingested into the knowledge base in S120, as the location needs to be known before the weather at that location can be determined.

Next, in S122, it is determined there is another meta-data node 202 that has not been executed. In the example, this is the Weather meta-data node 202. The process then returns to S118, and the second meta-data node is executed to generate a second meta-data node result 220. The integration module 1014 sends the output from the location generation service (table 220 in FIG. 3) as a request to the serviceURL 206: http://localhost:12010/daFdcService/weather listed in the configuration data 1010. It is noted that when two or more meta-data nodes are chained together, the ingestion process renames the first executed meta-data node, as appropriate, to have the data stored in the correct location of the model in the knowledge graph, prior to execution of the second meta-data node. In the non-exhaustive example shown herein, the first meta-data node result 220 ("AircraftLoca-

```
WeatherConfig is a FdcConfig,
    with fdcClass daDemo:Weather,
    with serviceURL "http://localhost:12010/daFdcService/weather",
    with ingestNodegroupID "daFdcIngestWeather",
    with input WeatherInput1.
WeatherInput1 is a FdcInput,
    with inputIndex 1,
    with subgraphLink (a FdcInputSubgraphLink
        with subjectClass daDemo:Weather
        with predicateProp location
        with objectClass deDemo:Location
        }
    with parm (a FdcParam with columnName "latitude", with classURI deDemo:Location, with propertyURI deDemo:latitude),
    with parm (a FdcParam with columnName "longitude", with classURI deDemo:Location, with propertyURI daDemo:longitude),
    with parm (a FdcParam with columnName "location", with classURI deDemo:Location).
```

As described above, the order of execution of S114 and S116 may be reversed, and in this non-exhaustive example, the integration module 1014, having identified two (or more) meta-data nodes that may need to access external data stores, may first determine an order of execution of the meta-data nodes (S116) and then retrieve internal data (S114). In this case, the integration module 1014 may determine from the configuration data that the Weather input node-group 216 includes an FDC class AircraftLocation, and that AircraftLocation is another meta-data node. Since Weather needs AircraftLocation, the integration module 1014 may order AircraftLocation for first execution and Weather for second execution, as the weather input node-group cannot be executed until it receives the output from the execution of the AircraftLocation input node group. Once AircraftLocation input node-group is completed, then the Weather node-group may be executed using that output. In one or more embodiments, when one meta-data node uses as input the output from another meta-data node, the two (or more) meta-data nodes together form a "chain" of dependent meta-data nodes. It is noted that when one of the input node groups contains another meta-data node, they may or may not need to be chained, as determined by additional logic.

With respect to the meta-data node 202 "aircraft location," the same procedure is followed as described above with respect to the non-exhaustive example in FIG. 2. to execute the first meta-data node per S118. The first metation") is saved as WeatherInput1. The weather generator external service 1024 accessible via the serviceURL 206 retrieves the requested data and returns it as a table to the integration module 1014. It is noted that the weather generator external service (or other generator external service) may generate additional data that is more than the specific data requested by the initial query, and may return this additional data with the requested data. With respect to the weather generator external service 1024, humidity, pressure, summary, etc. may be returned with tempF. In one or more embodiments, all of the information returned from the generator external service (e.g., the requested data and additional data) may be ingested into the semantic data store 1008 in S120. In this non-exhaustive example, the ingestion process ingests all of the received data (tempF and additional data) into the semantic data store/knowledge graph 1008 using the ingestion template named: "daFdcIngestWeather" per ingestNodegroupID 208 in the configuration data 1010. This creates a weather instance object in the knowledge graph 1008 that is linked to weather for a given location. Continuing with this example, it is determined in S122 that no meta-data nodes remain, the process proceeds to S124, and the initial query 1002 (temperature outside a given aircraft), via the query generator service 1022, and then executes the initial query 1002 to generate a final result 302 (FIG. 8).

In one or more embodiments, execution of the initial query 1002 includes the ingested results.

FIG. 10 is a block diagram of system architecture 1000 according to some embodiments. Embodiments are not limited to architecture 1000.

Architecture 1000 includes a platform 103, an integration module 1014, a user platform 1030, a data store 1020 (e.g., database). In one or more embodiments, the integration module 1014 may reside on the platform 1034. Platform 1034 provides any suitable interfaces through which users/other systems 1032 may communicate with the integration module 1014.

In one or more embodiments, the output 1036 (e.g., final result 220) of the integration module 1014 may be output to a user platform 1030 (a control system, a desktop computer, a laptop computer, a personal digital assistant, a tablet, a smartphone, etc.) to view information about the query results. In one or more embodiments, the output 1036 from the integration module 1014 may be transmitted to various user platforms or to other system (1032), as appropriate (e.g., for display to, and manipulation by, a user, further analysis and manipulation).

In one or more embodiments, the system 1000 may include one or more processing elements 1035 and a memory/computer data store 1020. The processor 1035 may, for example, be a microprocessor, and may operate to control the overall functioning of the integration module 1014. In one or more embodiments, the integration module 1014 may include a communication controller for allowing the processor 1035 and hence the integration module 1014, to engage in communication over data networks with other devices (e.g., user interface 1030 and other system 1032).

In one or more embodiments, the system 1000 may include one or more memory and/or data storage devices 1020 that store data that may be used by the module. The data stored in the data store 1020 may be received from disparate hardware and software systems, some of which are not inter-operational with one another. The systems may comprise a back-end data environment employed by a business, industrial or personal context.

In one or more embodiments, the data store 1020 may comprise any combination of one or more of a hard disk drive, RAM (random access memory), ROM (read only memory), flash memory, etc. The memory/data storage devices 1020 may store software that programs the processor 1035 and the integration module 1014 to perform functionality as described herein.

In one or more embodiments, the system 1000 may, as part of the integration module 1014, include other elements including, but not limited to, an external metadata node handler 1038, a node group execution service 1040, a node group store 1042, an ingestion process 1044, a SPARQL query service 1046, an asynchronous execution service 1048, and an external data service 1050. It is noted that while these other elements are included as part of the system 1000, the system 1000 may be built using other elements to perform the processes described herein. The external metadata node handler 1038 may find the meta-data nodes, build sub-queries, call external data services, ingest results. The node group execution service 1040 may execute queries based on the node group name, which may be used, for example, when running ingestion queries by name. The node group store 1042 may be used to lookup the ingestion node group by name and then the node group execution service may execute the ingestion based simply in the input data and the node group name. The node group store 1042 may save and retrieve node groups by name. The ingestion process 1044 may map and ingest data into the linked data store. The SPARQL query service 1046 may execute queries against the linked data store. The asynchronous execution services 1048 may allow any functions to be executed asynchronously so that no HTTP timeouts occur. The external data services 1050 may generate or retrieve from external sources any external data as specified by the external metadata nodes configuration.

As used herein, devices, including those associated with the system 1000 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 11:
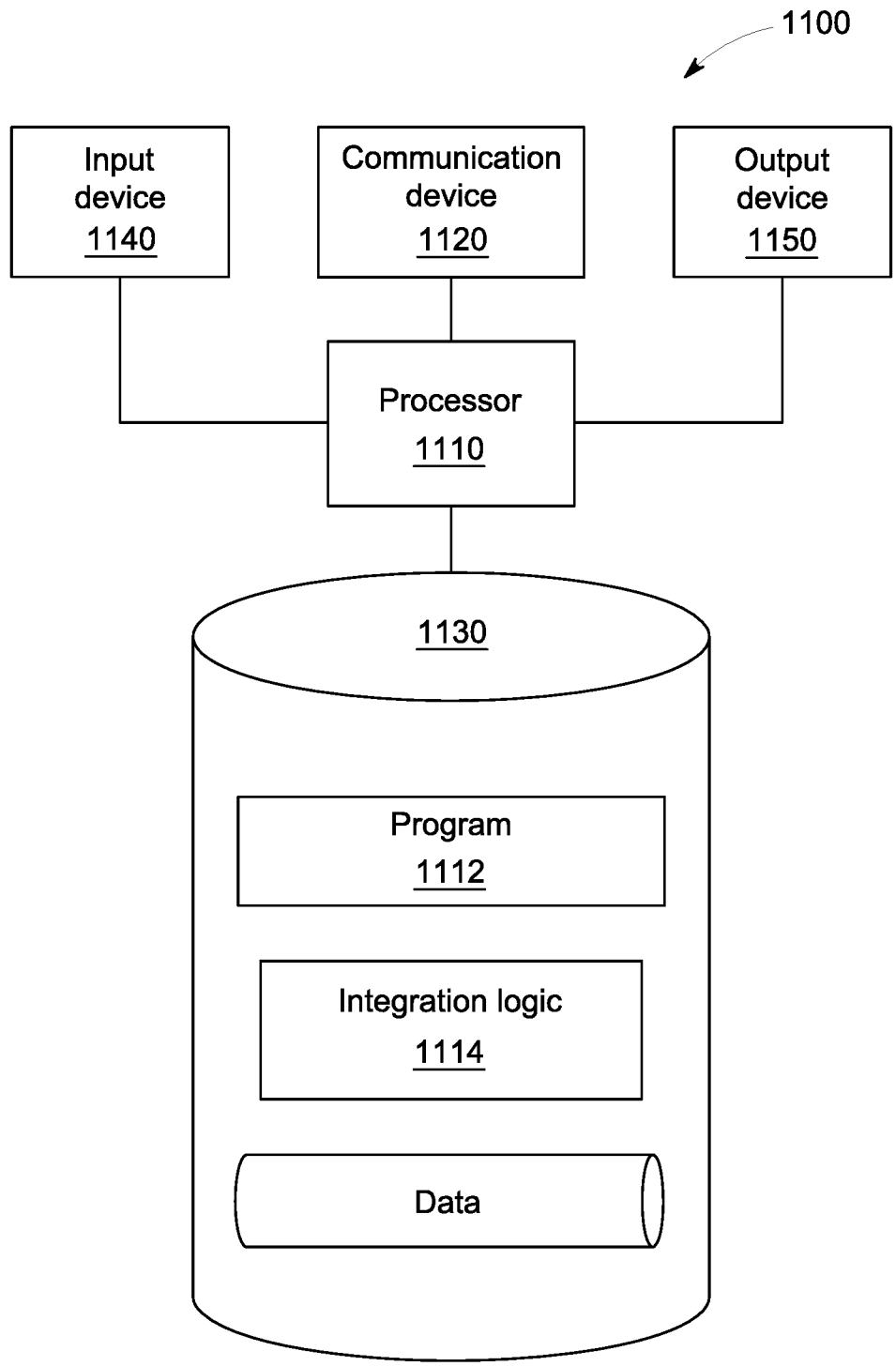
FIG. 11 is a block diagram of an integration platform according to some embodiments of the present invention.

The embodiments described herein may be implemented using any number of different hardware configurations. For example, FIG. 11 is a block diagram of an integration platform 1100 that may be, for example, associated with the system 1000 of FIG. 10. The integration platform 1100 may be implemented using any architecture that is or becomes known, including but not limited to distributed, on-premise, cloud-based and hybrid architectures, as well as embedded in another system. Embodiments are not limited to the integration platform 1100. The integration platform 1100 may be a database node, a server, a cloud platform, a user device, or the like. The integration platform 1100 comprises a processor 1110, such as one or more processing devices each including one or more processing cores, and/or one or more commercially available Central Processing Units ("CPUs") in the form of one-chip microprocessors, coupled to a communication device 1120 configured to communicate via a communication network (not shown in FIG. 11). In some examples the processor is a multicore processor or a plurality of multicore processors. The processor may be fixed or reconfigurable. The communication device 1120 may be used to communicate, for example, with one or more data sources, user platforms, other systems etc. The integration platform 1100 further includes an input device 1140 (e.g., a computer mouse and/or keyboard, other pointing device, keypad, a microphone, a knob or a switch, an infrared (IR) port, a docking station, and/or a touch screen to input information) and/an output device 1150 (e.g., a speaker, printer, and/or computer monitor to render a display, provide alerts, transmit recommendations, and/or create reports). The input/output devices may include an interface, a port, a cable, a bus, a board, a wire and the like. For example, data may be output to an embedded display of the integration platform 1100, an externally connected display, a display connected to the cloud, another device, and the like. According to some embodiments, a mobile device, monitoring physical system, and/or PC may be used to exchange information with the integration platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 may or may not be included within a database system, a cloud environment, a web server, or the like. The storage device 1130 stores a program 1112 and/or integration processing logic 1114 for controlling the processor 1110. The processor 1110 performs instructions of the programs 1112, 1114, and thereby operates in accordance with any of the embodiments described herein. For example, the processor 1110 may receive a node-group, execute one or more queries to receive internal and externa data, ingest the received data into a knowledge graph and then execute the initial query.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the integration platform 1100 from another device; or (ii) a software application or module within the integration platform 1100 from another software application, module, or any other source.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, note that some embodiments may be associated with a display of information to an operator.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computer-implemented method comprising
receiving a node group at an integration module, wherein the node group includes one or more requests for internal data and external data, wherein internal data is data stored in an internal datastore and external data is data stored outside of the internal data store;
identifying in a configuration data, one or more meta-data nodes from the node group, wherein each meta-data node indicates a request for external data;
retrieving the internal data via execution of an internal data query;
determining an order of execution for the one or more meta-data nodes;
executing a first meta-data node based on the determined order to generate a first result;
ingesting the first result into a semantic datastore; and
executing a query to generate a final result, wherein the query includes the retrieved internal data and the ingested first result.

2. The method of claim 1, wherein the order of execution of the meta-data nodes is based on whether the execution of a given meta-data node uses a result of the execution of another meta-data node.

3. The method of claim 1, wherein, prior to executing the query to generate the final result:
generating the query in SPARQL query language.

4. The method of claim 1, further comprising, prior to executing the query to generate the final result:
executing a second meta-data node based on the generated first result to generate a second result;
ingesting the second result in the semantic datastore; and
executing the query to generate the final result, wherein the query includes the received internal data, the ingested first result and the ingested second result.

5. The method of claim 1, wherein ingesting the first result into the semantic data store further comprises:
ingesting the first result into an ingestion node group, wherein the ingestion node group is different from the node group.

6. The method of claim 1, wherein each node group includes one or more nodes, and each node: represents a class variable in a query, has a unique identifier and a list of properties.

7. A system comprising:
an integration module;
one or more external data stores storing external data, wherein external data is data stored outside of an internal data store;
a memory storing program instructions: and
an integration processor, coupled to the memory, and in communication with the signature module and operative to execute program instructions to:
receive a node group at the integration module, wherein the node group includes one or more requests for internal data and external data, wherein internal data is data stored in an internal datastore;
identify in a configuration data one or more meta-data nodes from the node group, wherein each meta-data node indicates a request for external data;
retrieve the internal data via execution of an internal data query;
determine an order of execution for the one or more meta-data nodes;
execute a first meta-data node based on the determined order to generate a first result;
ingest the first result into a semantic datastore; and
execute a query to generate a final result, wherein the query includes the retrieved internal data and the ingested first result.

8. The system of claim 7, wherein the order of execution of the meta-data nodes is based on whether the execution of a given meta-data node uses a result of the execution of another meta-data node.

9. The system of claim 7, wherein, prior to execution of the query, the query is generated in SPARQL query language.

10. The system of claim 7, further comprising, prior to executing the query to generate the final result, program instructions to:
 execute a second meta-data node based on the generated first result to generate a second result;
 ingest the second result in the semantic datastore; and
 execute the query to generate the final result, wherein the query includes the generate internal data, the ingested first result and the ingested second result.

11. The system of claim 7, wherein ingesting the first result into the semantic data store further comprises program instructions to:
 ingest the first result into an ingestion node group, wherein the ingestion node group is different from the node group.

12. The system of claim 7, wherein each node group includes one or more nodes, and each node: represents a class variable in a query, has a unique identifier and a list of properties.

13. A non-transient, computer-readable medium storing instructions to be executed by a processor to perform a method comprising:
 receiving a node group at an integration module, wherein the node group includes one or more requests for internal data and external data, wherein internal data is data stored in an internal datastore and external data is data stored outside of the internal data store;
 identifying in a configuration data, one or more meta-data nodes from the node group, wherein each meta-data node indicates a request for external data;
 retrieving the internal data via execution of an internal data query;
 determining an order of execution for the one or more meta-data nodes;
 executing a first meta-data node based on the determined order to generate a first result;
 ingesting the first result into a semantic datastore; and
 executing a query to generate a final result, wherein the query includes the retrieved internal data and the ingested first result.

14. The medium of claim 13, wherein the order of execution of the meta-data nodes is based on whether the execution of a given meta-data node uses a result of the execution of another meta-data node.

15. The medium of claim 13, wherein, prior to execution of the query, the query is generated in SPARQL query language.

16. The medium of claim 13, further comprising, prior to executing the query to generate the final result:
 executing a second meta-data node based on the generated first result to generate a second result;
 ingesting the second result in the semantic datastore; and
 executing the query to generate the final result, wherein the query includes the retrieved internal data, the ingested first result and the ingested second result.

17. The medium of claim 13, wherein ingesting the first result into the semantic data store further comprises:
 ingesting the first result into an ingestion node group, wherein the ingestion node group is different from the node group.

18. The medium of claim 13, wherein each node group includes one or more nodes, and each node: represents a class variable in a query, has a unique identifier and a list of properties.

19. The method of claim 1, wherein determining the order of execution for the one or more meta-data nodes is based on a determination that the execution of any of the one or more meta-data nodes uses data from another of the one or more meta-data nodes.

* * * * *